United States Patent [19]
Maytum

[11] 3,817,168
[45] June 18, 1974

[54] FRUIT PITTING MACHINE

[75] Inventor: Derek Laurie Maytum, Norwich, England

[73] Assignee: Gunson's Sortex Limited, London, England

[22] Filed: Feb. 16, 1973

[21] Appl. No.: 333,224

[30] Foreign Application Priority Data
Feb. 22, 1972 Great Britain ............... 8138/72

[52] U.S. Cl. ................................................ 99/490
[51] Int. Cl. ............................................... A23n 3/00
[58] Field of Search ............ 99/485, 486, 490, 491, 99/537, 538, 547, 548, 559, 560, 561, 565, 566

[56] References Cited
UNITED STATES PATENTS

| | | | |
|---|---|---|---|
| 2,205,397 | 6/1940 | Drake | 99/490 |
| 2,232,207 | 2/1941 | Carroll | 99/490 |
| 2,238,980 | 4/1941 | Metcalf et al. | 99/490 X |
| 2,298,613 | 10/1942 | Carroll et al. | 99/490 |
| 2,547,207 | 4/1951 | Harworth et al. | 99/490 |
| 3,162,223 | 12/1964 | Loveland | 99/561 X |

*Primary Examiner*—Donald E. Watkins
*Attorney, Agent, or Firm*—McGarry & Waters

[57] ABSTRACT

A fruit pitting machine comprises pitting means for removing pits from pit-containing fruit, separator means for effecting relative separation between pitted and unpitted fruit, means for presenting each of a plurality of pieces of fruit successively to the pitting means and to the separator means, a sonic transducer arranged to be struck by a pit removed from a piece of fruit by said pitting means, and control means, controlled by signals from said sonic transducer, for controlling operation of the separator means so as to effect the said relative separation.

12 Claims, 2 Drawing Figures

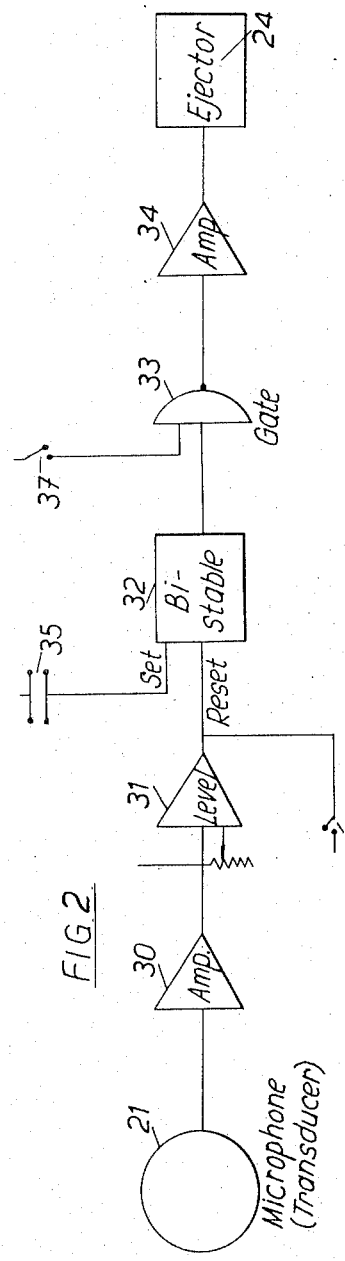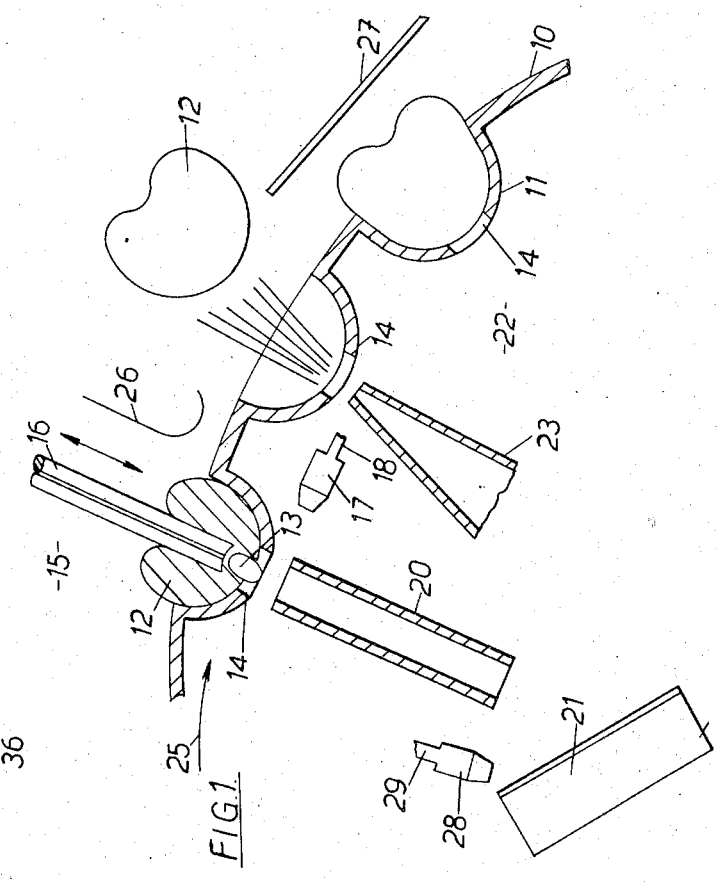

FRUIT PITTING MACHINE

This invention concerns a fruit pitting machine for pitting, i.e. removing pits from, cherries, olives and other pit-containing fruit.

BRIEF SUMMARY OF THE INVENTION

According to the present invention, there is provided a fruit pitting machine comprising pitting means for removing pits from pit-containing fruit, separator means for effecting relative separation between pitted and unpitted fruit, means for presenting each of a plurality of pieces of fruit successively into the pitting means and to the separator means, a sonic transducer arranged to be struck by a pit removed from a piece of fruit by said pitting means, and control means, controlled by signals from said sonic transducer, for controlling operation of the separator means so as to effect the said relative separation.

The machine preferably comprises a carrier member having equi-spaced apart pockets for receiving the pieces of fruit, and means for intermittently moving the carrier member so that, in operation, each piece of fruit is first brought to the pitting means, and is then maintained stationary while being pitted, and is thereafter moved on to the separator means. Thus the carrier member may be a rotary member whose pockets are equi-angularly spaced apart.

The separator means may comprise ejector means for ejecting unpitted fruit, and, if desired, partially pitted fruit.

Preferably the machine is provided with a fruit detector which is connected to the control means so that the ejector means can be operated only when a piece of fruit is being presented to the ejector means.

The ejector means may comprise means for directing a jet of air onto an unpitted or partially pitted piece of fruit so as to remove the latter.

The control means may comprise a bi-stable device which is set whenever the pitting means operates, the bi-stable device being connected to the sonic transducer so that it is reset by the latter whenever the bi-stable device receives a predetermined signal therefrom, the bi-stable device passing an operating signal to the ejector means to operate the latter only when the bi-stable device has failed to be re-set.

The sonic transducer may be connected to the bi-stable device by a circuit which includes an adjustable level detector, the latter being adjustable so that signals from the sonic transducer below a certain strength will not cause resetting of the bi-stable device.

The bi-stable device may be connected to the ejector means by a circuit including a storage device, means being provided for releasing a signal from the storage device to operate the ejector means only when the piece of fruit which has given rise to the said operating signal has moved to a position in which it may be removed by the ejector means.

Means are preferably provided for reducing the extent to which the sonic transducer is struck by non-pit material which has been removed from the fruit. Thus the last-mentioned means may comprise a nozzle, and means for supplying the nozzle with a flow of fluid.

Means are also preferably provided for directing a flow of washing liquid over the sonic transducer.

The invention is illustrated, merely by way of example, in the accompanying drawings.

DESCRIPTION OF DRAWINGS

FIG. 1 is a diagrammatic sectional view of a fruit pitting machine according to the present invention, and FIG. 2 is a block diagram of an electrical circuit employed in the fruit pitting machine of FIG. 1.

DETAILED DESCRIPTION OF THE INVENTION

Referring to the drawings, a fruit pitting machine according to the present invention comprises a hollow rotary carrier member 10 having a plurality of equi-angularly spaced apart pockets 11, each of the pockets 11 being adapted to receive a cherry 12 having a pit 13. Each of the pockets 11 is of substantially hemispherical shape and is provided with an aperture 14 at its radially innermost portion which communicates with the hollow interior of the carrier member 10.

The machine is provided at a pitting station 15 with pitting means which includes a pitting blade 16 for removing the pits 13. A pit 13 removed by the pitting blade 16 is forced thereby through the respective aperture 14 and falls through a stationary guide tube 20 so as to strike a stationary microphone, or other sonic transducer, 21.

A nozzle 17, which is supplied with compressed air or other fluid through a pipe 18 from a source (not shown), directs a flow of the compressed air or other fluid transversely of the line of fall of the pits 13 so as to remove the loose "flesh" which has been forced out of the cherry during the pitting. It is desirable to remove such "flesh" since the microphone 21 is otherwise liable to produce misleading signals. If desired, the nozzle 17 instead of being disposed as shown radially outwardly of the guide tube 20 could be disposed radially inwardly thereof.

The machine is also provided, at an ejector station 22, with a stationary nozzle 23 through which a jet of compressed air from an ejector 24 (FIG. 2) may be directed through the respective aperture 14 so as to remove an unpitted, or partially pitted, cherry 12 from the carrier member 10.

The carrier member 10 is intermittently rotatable (by means not shown) in the direction of an arrow 25. The intermittent rotation of the carrier member 10 is such that each cherry 12 is successively first brought to the pitting station 15, is then maintained stationary while being pitted by the pitting blade 16, and is thereafter moved to the ejector station 22 at which, if the pit 13 has not been removed or has not been wholly removed, the cherry will be ejected by a jet of air directed through the nozzle 23. Each cherry 12, in the course of being moved from the pitting station 15 to the ejector station 22, operates a fruit detector 26.

The machine is provided with two delivery chutes which are separated from each other by a division plate 27, the accepted cherries passing between the division plate 27 and the carrier member 10, and the rejected cherries passing externally of the division plate 27.

A nozzle 28, which is supplied with water or other washing liquid through a pipe 29 from a source (not shown), directs a flow of the said washing liquid over the microphone 21 to prevent a layer of dirt and cherry material from building up on the microphone 21 and rendering the latter insensitive. Thus the said cherry material may be constituted by pit particles or by "flesh" carried by the punched out pits.

As will be seen from FIG. 2, the microphone 21 is connected to the ejector 24 by a circuit which includes an amplifier 30, an adjustable level detector 31, a bi-stable device 32, a gate 33, and an amplifier 34, the circuit being such that signals from the microphone 21 control operation of the ejector 24 so as to effect ejection of any unpitted, or partially pitted, cherries.

The bi-stable device 32 is set as a result of the pitter blade 16 travelling downwardly and thereby closing a switch 35. The bi-stable device 32 is, however, connected to the microphone 21 so that, when the latter is struck by a whole pit 13, the bi-stable device 32 will be reset, and thus will not pass an operating signal through the detector 24. The arrangement is such that an operating signal can only be passed to the ejector 24 so as to operate the latter and effect ejection of a cherry 12 when the bi-stable device 32 has failed to be reset by reason of the fact that the microphone 21 has either not been struck by a pit 13 at all, or has only been struck by a fragment of a pit. In order to be able to achieve this result, the level detector 31 is adjustable so that the amplified signals from the microphone 21 which are below a certain strength will not cause resetting of the bi-stable device 32. Equally, any extraneous noise picked up by the microphone 21 will be insufficient to effect resetting of the bi-stable device 32.

The fruit detector 26 is arranged to operate a switch 36 so that, if a cherry 12 is not detected thereby in the course of one of the intermittent angular movements of the carrier member 10, then the bi-stable device 32 will be reset, and the ejector device 24 will not be actuated, whereby to save the expenditure of unnecessary compressed air. Thus the fruit detector 26 ensures that the ejector 24 can be operated only when a cherry 12 is being presented thereto. This is a desirable feature of the machine since, for example, 20% of the pockets 11 may not have been supplied with cherries.

When the carrier member 10 stops at each of its angular positions, a switch 37 is closed. As a result, signals from the bi-stable device 32 which have been stored in the gate 33 in consequence of the bi-stable device 32 not being reset, are released from the gate 33, are amplified by the amplifier 34, and, effect actuation of the ejector 24.

It will be appreciated that the machine illustrated in the drawings can be reset, by appropriate adjustment of the level indicator 31, to ignore part-pits resulting from the pit being broken by the pitting blade 16. The microphone 21, moreover, may be set to ignore being struck by any flesh from the cherries 12, the latter being a possibility if the pit is off-centre so that flesh is removed by the pitting blade 16. Moreover, the microphone 21 will be relatively insensitive to dirt or moisture.

If desired, means (not shown) may be provided to increase the velocity of the pit 13, as it emerges from the cherry 12, above that it would have as a result of gravitational forces acting on it. This may be achieved by the use of compressed air or any other fluid, or by mechanical means.

Instead of using an air ejector 24 mechanical ejectors may be employed.

I claim:

1. A fruit pitting machine comprising pitting means for removing pits from pit-containing fruit, separator means for effecting relative separation between pitted and unpitted fruit, means for presenting each of a plurality of pieces of fruit successively to the pitting means and to the separator means, a sonic transducer arranged to be struck by a pit removed from a piece of fruit by said pitting means, and control means, controlled by signals from said sonic transducer, for controlling operation of the separator means so as to effect the said relative separation.

2. A machine as claimed in claim 1 comprising a carrier member having equi-spaced apart pockets for receiving the pieces of fruit, and means for intermittently moving the carrier member to cause each piece of fruit to be first brought to the pitting means, then maintained stationary while being pitted, and thereafter be moved on to the separator means.

3. A machine as claimed in claim 2 in which the carrier member is a rotary member whose pockets are equi-angularly spaced apart.

4. A machine as claimed in claim 1 in which the separator means comprises ejector means for ejecting unpitted fruit and, if desired, partially pitted fruit.

5. A machine as claimed in claim 4 in which the machine is provided with a fruit detector which is connected to the control means, the ejector means being operated only when a piece of fruit is being presented to the ejector means.

6. A machine as claimed in claim 4 in which the ejector means comprises means for directing a jet of air onto an unpitted piece of fruit so as to remove the latter.

7. A machine as claimed in claim 4 in which the control means comprises a bi-stable device which is set whenever the pitting means operates, the bi-stable device being connected to the sonic transducer so that it is reset by the latter whenever the bi-stable device receives a predetermined signal therefrom, the bi-stable device passing an operating signal to the ejector means to operate the latter only when the bi-stable device has failed to be reset.

8. A machine as claimed in claim 7 in which the sonic transducer is connected to the bi-stable device by a circuit which includes an adjustable level detector, the latter being adjustable so that signals from the sonic transducer below a certain strength will not cause resetting of the bi-stable device.

9. A machine as claimed in claim 7 in which the bi-stable device is connected to the ejector means by a circuit including a storage device, means being provided for releasing a signal from the storage device to operate the ejector means only when the piece of fruit which has given rise to the said operating signal has moved to a position in which it may be removed by the ejector means.

10. A machine as claimed in claim 1 comprising means for reducing the extent to which the sonic transducer is struck by non-pit material which has been removed from the fruit.

11. A machine as claimed in claim 10 in which the last-mentioned means comprises a nozzle, and means for supplying the nozzle with a flow of fluid.

12. A machine as claimed in claim 1 comprising means for directing a flow of washing liquid over the sonic transducer.

* * * * *